United States Patent
Choi

(10) Patent No.: US 12,497,040 B2
(45) Date of Patent: Dec. 16, 2025

(54) VEHICLE CONTROL SYSTEM AND VEHICLE DRIVING METHOD USING THE VEHICLE CONTROL SYSTEM

(71) Applicant: HYUNDAI MOBIS CO., LTD., Seoul (KR)

(72) Inventor: Kwang Ii Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 230 days.

(21) Appl. No.: 17/950,303

(22) Filed: Sep. 22, 2022

(65) Prior Publication Data
US 2023/0150499 A1 May 18, 2023

(30) Foreign Application Priority Data

| Nov. 16, 2021 | (KR) | 10-2021-0157993 |
| Nov. 16, 2021 | (KR) | 10-2021-0157994 |
| Nov. 16, 2021 | (KR) | 10-2021-0157997 |
| Nov. 16, 2021 | (KR) | 10-2021-0157999 |
| Nov. 16, 2021 | (KR) | 10-2021-0158002 |

(51) Int. Cl.
| *B60W 30/14* | (2006.01) |
| *B60W 30/12* | (2020.01) |
| *B60W 40/06* | (2012.01) |
| *G01C 21/00* | (2006.01) |
| *G06V 10/60* | (2022.01) |

(Continued)

(52) U.S. Cl.
CPC .......... *B60W 30/143* (2013.01); *B60W 30/12* (2013.01); *B60W 40/06* (2013.01); *G01C 21/3815* (2020.08); *G01C 21/3841* (2020.08); *G06V 10/60* (2022.01); *G06V 20/582* (2022.01); *G06V 20/588* (2022.01); *B60W 2420/403* (2013.01); *B60W 2552/15* (2020.02); *B60W 2552/30* (2020.02); *B60W 2552/53* (2020.02); *B60W 2556/40* (2020.02)

(58) Field of Classification Search
None
See application file for complete search history.

(56) References Cited

U.S. PATENT DOCUMENTS

| 2016/0114794 A1* | 4/2016 | Sakaguchi ...... B60W 30/18145 701/72 |
| 2016/0339884 A1* | 11/2016 | Lu ...................... B60T 8/17552 |

(Continued)

FOREIGN PATENT DOCUMENTS

| JP | 2018167735 A | * 11/2018 | |
| WO | WO-2023286303 A1 | * 1/2023 | ........... G06V 20/588 |

OTHER PUBLICATIONS

Gupta, Abhishek et al., "Estimation of Road Transverse Slope Using Crowd-Sourced Data from Smartphones," Nov. 2020, SIGSPATIAL '20 (Year: 2020).*

*Primary Examiner* — Madison R. Inserra
(74) *Attorney, Agent, or Firm* — NSIP Law

(57) ABSTRACT

Disclosed are a vehicle control system and a driving method of a vehicle using the vehicle control system. The vehicle control system includes a vehicle controller that controls driving of a vehicle and one or more processors that process data related to the driving of the vehicle, receive information about a longitudinal gradient and a transverse gradient of the vehicle from a server, and control a driving speed, and an Advanced Driver Assistant System (ADAS), and/or set a landmark, based on the information on the longitudinal gradient and the transverse gradient.

14 Claims, 17 Drawing Sheets

(51) Int. Cl.
*G06V 20/56* (2022.01)
*G06V 20/58* (2022.01)

(56) References Cited

U.S. PATENT DOCUMENTS

2019/0256103 A1* 8/2019 Capua .................. B60W 40/101
2019/0271550 A1* 9/2019 Breed ................. G01C 21/3848
2021/0024074 A1* 1/2021 Liu .......................... G01S 17/89

* cited by examiner

VEHICLE CONTROL SYSTEM AND VEHICLE DRIVING METHOD USING THE VEHICLE CONTROL SYSTEM

CROSS-REFERENCE TO RELATED APPLICATIONS

This application claims the benefit under 35 USC § 119(a) of Korean Patent Application Nos. 10-2021-0157993, 10-2021-0157994, 10-2021-0157997, 10-2021-0157999, and 10-2021-0158002, all filed on Nov. 16, 2021, in the Korean Intellectual Property Office, the entire disclosures of which are incorporated herein by reference for all purposes.

BACKGROUND

1. Field

The present disclosure relates to a vehicle control system and a vehicle driving method using the vehicle control system, and to an autonomous driving technology that improves accuracy of a target travel route.

2. Description of Related Art

Autonomous driving technology may include setting a travel route of a vehicle and having the vehicle travel according to the set travel route while the driver does not drive the vehicle directly. Autonomous driving technology has been implemented in a scheme of acquiring route information on the travel route, setting the travel route based on the obtained route information, and driving the vehicle according to the set route.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a vehicle control system that includes a vehicle controller that controls driving of a vehicle. The vehicle control system includes one or more processors that process data related to the driving of the vehicle, receive information about a longitudinal gradient and a transverse gradient of the vehicle from a server, and control, by the vehicle controller, at least one of a driving speed, an Advanced Driver Assistant System (ADAS), and/or set a landmark, based on the information on the longitudinal gradient, the transverse gradient, and the processed data related to the driving of the vehicle.

The information about the longitudinal gradient and the transverse gradient may include a longitudinal gradient value and a transverse gradient value corresponding to a travel position of the vehicle. The one or more processors may control the ADAS, determine a slope of a current travel section based on the longitudinal gradient value, and control the driving speed based on the slope, and control an amount of compensation for pulling in a straight section of the ADAS or a control amount in a curve section, based on the transverse gradient value.

The one or more processors may update an average value of the longitudinal gradient values and an average of the transverse gradient values of a plurality of vehicles when constructing a three-dimensional map.

The one or more processors may control a force used for driving the vehicle to maintain the driving speed based on whether a current travel section is longitudinally an uphill or downhill section and/or control a relative position of the vehicle on a lane based on the transverse gradient value.

The vehicle control system may include a sensor for acquiring data related to the driving of the vehicle and the external environment. The information about the longitudinal gradient and the transverse gradient includes a second value of each of the longitudinal gradient and the transverse gradient of the vehicle. The one or more processors may calculate a first value of the longitudinal gradient and the transverse gradient of the vehicle based on the sensor, receive the second value of the longitudinal gradient and the transverse gradient from the server, correct an offset of the sensor based on a difference between the first value and the second value, and control the ADAS using the sensor with the corrected offset.

The server may collect data about gradient information of a three-dimensional map from a plurality of vehicles.

The one or more processors may set at least one landmark based on the information on the longitudinal gradient, and the transverse gradient.

The vehicle control system may include an imaging device for sensing and imaging the external environment. The one or more processors may select a plurality of landmarks based on image information obtained from the imaging device, divide sections between the selected plurality of landmarks into divided distance units based on a specified distance, apply the information about the longitudinal gradient and the transverse gradient received from the server to each of the divided distance units, set each section that includes the divided distance units to which the information about the longitudinal gradient and the transverse gradient have been applied as a new landmark.

The vehicle control system may include a sensor for acquiring data related to the driving of the vehicle from the vehicle and the external environment. The one or more processors may select an existing landmark, and calculate the longitudinal gradient and the transverse gradient using the sensor.

The information about the longitudinal gradient and the transverse gradient may include a longitudinal gradient value and a transverse gradient value. The one or more processors may divide a section between the landmarks into a unit length having the specified distance, based on an average value of the longitudinal gradient values and an average value of the transverse gradient values.

The one or more processors may sequence longitudinal gradient and transverse gradient ratios based on a certain distance between the landmarks and set the sequencing result as a new landmark with a feature.

In another general aspect, here is provided a vehicle control system that includes a vehicle controller that controls the driving of the vehicle, a sensor that acquires data related to driving of a vehicle from the vehicle and an external environment, one or more processors that process data related to the driving of the vehicle, set an interior of a tunnel along which the vehicle is driving as a landmark, identify whether an illuminance sensor of the vehicle is activated at a time within a time specified range, identify, by the illuminance sensor, whether lights surrounding vehicles are turned on and a position lightings in the tunnel, and calculate an estimated trajectory based on the position of the lightings in the tunnel.

The one or more processors may determine whether the vehicle enters a tunnel, based on similarity of the estimated trajectory and a trajectory of a line recognized using the sensor.

The one or more processors may calculate an Equation representing a trajectory connecting the lightings in the tunnel with each other as a line Equation corresponding to the estimated trajectory.

Upon determining that the vehicle enters the tunnel, the one or more processors may set the current position as a feature and set a vicinity of a tunnel entrance as a landmark, and/or compose a three-dimensional map by inversely calculating a position based on a GPS signal of the vicinity of the entrance of the tunnel.

When the trajectory based on the line Equation and the trajectory of the line recognized using the sensing device are similar to each other, the one or more processors may determine that the vehicle enters the tunnel.

The one or more processors may identify whether the estimated trajectory and an actually recognized line trajectory are similar to each other, calculate at least one road surface feature in the tunnel, detect a distance between positions in the tunnel in which the lightings are installed, and a number of the positions in the tunnel in which the lightings are installed, and generate landmark information corresponding to the tunnel, wherein the landmark information includes information related to a continuous road surface feature among the at least one road surface feature and the number of positions where the lightings are installed.

In another general aspect, here is provided a method for driving a vehicle using a vehicle control system. The method includes receiving information about a longitudinal gradient and a transverse gradient of the vehicle from a server, and controlling a driving speed, controlling an Advanced Driver Assistant System (ADAS), and/or setting landmarks, based on the information on the longitudinal gradient and the transverse gradient.

The information about the longitudinal gradient and the transverse gradient may include a longitudinal gradient value and a transverse gradient value corresponding to a travel position of the vehicle. The controlling of the driving speed, the controlling of the ADAS, and/or the setting of the landmarks, based on the information on the longitudinal gradient and the transverse gradient may include determining a slope of a current travel section based on the longitudinal gradient value, and controlling the driving speed based on the slope, and controlling an amount of compensation for pulling in a straight section of the ADAS or a control amount in a curve section, based on the transverse gradient value.

The information about the longitudinal gradient and the transverse gradient may include a second value of each of the longitudinal gradient and the transverse gradient of the vehicle. The controlling of the driving speed, the controlling of the ADAS, and/or the setting of the landmarks, based on the information on the longitudinal gradient and the transverse gradient may include calculating a first value of the longitudinal gradient and the transverse gradient of the vehicle based on a sensor, receiving the second value of the longitudinal gradient and the transverse gradient from the server, correcting an offset of the sensor based on a difference between the first value and the second value, and controlling the ADAS using the sensor with the corrected offset.

The setting of the landmark, based on the information on the longitudinal gradient and the transverse gradient may include selecting the landmarks based on image information obtained from an imaging device of the vehicle control system, dividing sections between the landmarks into divided distance units based on a specified distance, applying the information about the longitudinal gradient and the transverse gradient received from the server to each of the divided distance units, and setting the sections including the divided distance units to which the information about the longitudinal gradient and the transverse gradient have been applied as a new landmark.

Other features and aspects will be apparent from the following detailed description, the drawings, and the claims.

Figure 1:
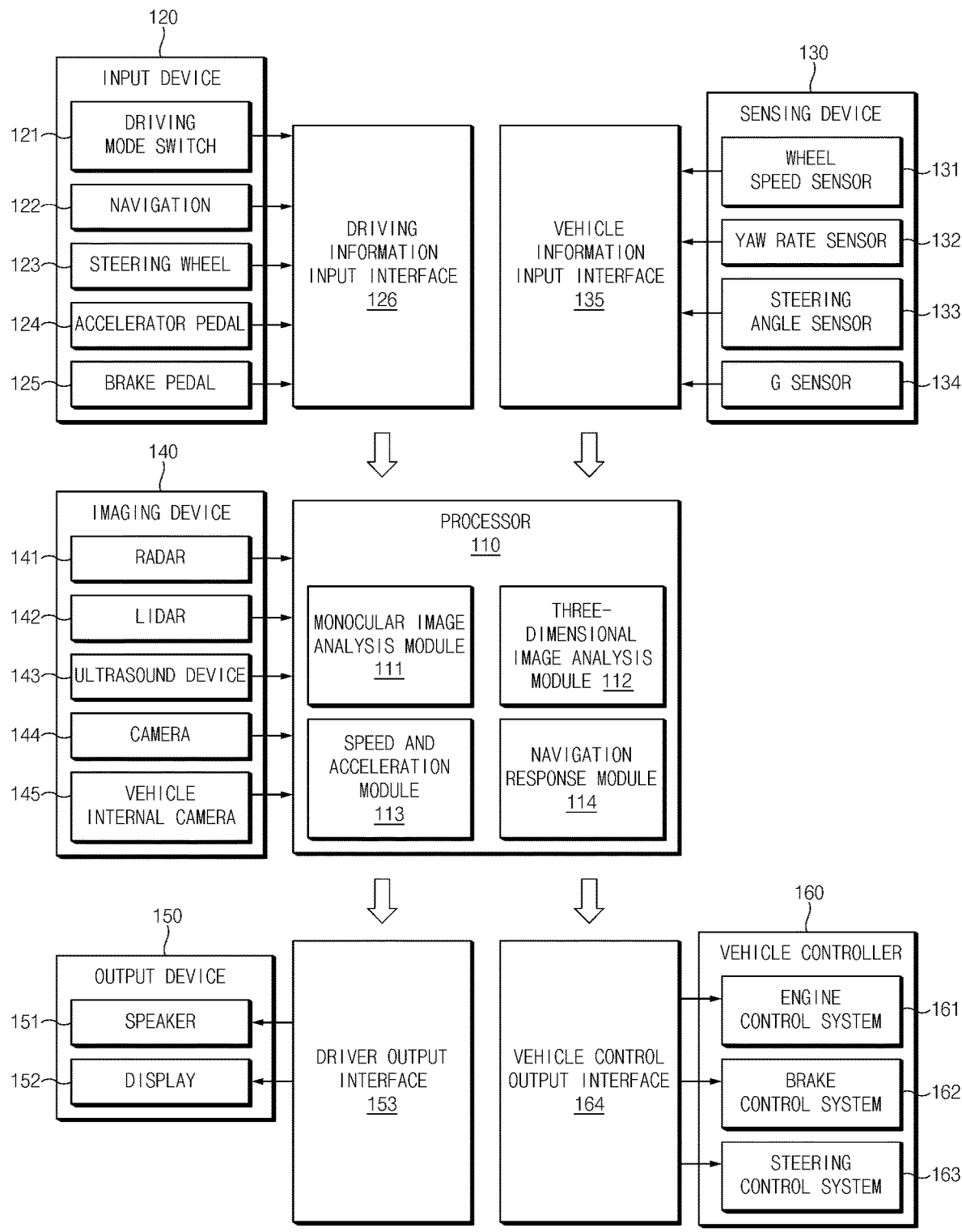
FIG. 1 is a block diagram showing a vehicle control system according to one embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a block diagram showing a vehicle control system according to one embodiment of the present disclosure.

The vehicle control system according to one embodiment may include a processor 110, an input device 120, a sensing device 130, an imaging device 140, an output device 150, and a vehicle controller 160.

The processor 110 may realize autonomous driving by processing data related to driving of a vehicle. The processor 110 may include a monocular image analysis module 111, a three-dimensional image analysis module 112, a speed and acceleration module 113, and a navigation response module 114.

The monocular image analysis module 111 may analyze a monocular image of an image set acquired by the imaging device 140. The monocular image analysis module 111 may merge data included in the image set with other types of data acquired by the imaging device 140 to perform monocular image analysis. The monocular image analysis module 111 may detect, within the image set, features such as a lane marking, a vehicle, a pedestrian, a road sign, a highway interchange, a traffic light, a risk object, and other feature related to the vehicle's surroundings. The processor 110 of the vehicle control system may cause at least one navigation response such as rotation, lane change, or acceleration change of the vehicle, based on the analysis result of the monocular image analysis module 111.

The three-dimensional image analysis module 112 may combine data acquired from the imaging device 140 and data acquired from the sensing device 130 with each other and perform analysis thereon. The three-dimensional image analysis module 112 may perform three-dimensional image analysis. The three-dimensional image analysis module 112 may implement a method related to a neural network learning system, a deep neural network learning system, or a non-learning system that utilizes a computer vision algorithm to detect and/or label an object in a context of capturing and processing sensed information. The three-dimensional image analysis module 112 may employ a combination of a learning system and a non-learning system.

The speed and acceleration module 113 may control change in a speed and/or an acceleration of the vehicle. The speed and acceleration module 113 may calculate a target speed of the vehicle based on data obtained from the monocular image analysis module 111 and/or the three-dimensional image analysis module 112. The data obtained from the monocular image analysis module 111 and/or the three-dimensional image analysis module 112 may include a target position, a speed, an acceleration, the vehicle's position and/or speed with respect to a surrounding vehicle, a pedestrian or an object on a road, and position information of the vehicle for lane indication of the road. The speed and acceleration module 113 may transmit a speed control signal to the vehicle controller 160 based on the calculated target speed.

The navigation response module 114 may determine a desired (or necessary/prudent, etc.) navigation response based on the data obtained from the monocular image analysis module 111, the three-dimensional image analysis module 112, and the input device 120. The data obtained from the monocular image analysis module 111, the three-dimensional image analysis module 112, and the input device 120 may include a position and a speed of the vehicle with respect to a surrounding vehicle, a pedestrian, and an object on a road, and target position information of the vehicle. The navigation response may be determined based on map data, preset vehicle position, a relative speed or a relative acceleration between the vehicle and at least one object. The navigation response module 114 may transmit a navigation control signal to the vehicle controller 160 based on a navigation response determined as being desired. For example, the navigation response module 114 may generate the desired navigation response by rotating the vehicle's steering handle to induce rotation by a preset angle. The navigation response determined to be desired by the navigation response module 114 may be used as data input to the speed and acceleration module 113 to calculate a speed change of the vehicle.

The input device 120 may receive a user input for controlling a driving function. The input device 120 may include a driving mode switch 121, a navigation 122, a steering wheel 123, an accelerator pedal 124, and a brake pedal 125. The input device 120 may transmit the user input to the processor 110 through a driving information input interface 126.

The sensing device 130 may acquire data related to driving of the vehicle from the vehicle and an external environment. The sensing device 130 may include a wheel speed sensor 131, a yaw rate sensor 132, a steering angle sensor 133, and a G sensor 134. The sensing device 130 may transmit the acquired data to the processor 110 through a vehicle information input interface 135.

The imaging device 140 may detect and image an external environment. The imaging device 140 may include a radar 141, a lidar 142, an ultrasound device 143, a camera 144, and a vehicle internal camera 145. The imaging device 140 may transmit the sensed and imaged external environment to the processor 110.

The output device 150 may provide information related to driving of the vehicle to an occupant including the driver. The output device 150 may include a speaker 151 and a display 152. The output device 150 may provide information related to driving of the vehicle output from the processor 110 through a driver output interface 153 to the occupant.

The vehicle controller 160 may control driving of the vehicle. The vehicle controller 160 may include an engine control system 161, a brake control system 162, and a steering control system 163. The vehicle controller 160 may receive driving control information output from the processor 110 through a vehicle control output interface 164 to control driving of the vehicle.

Figure 2:
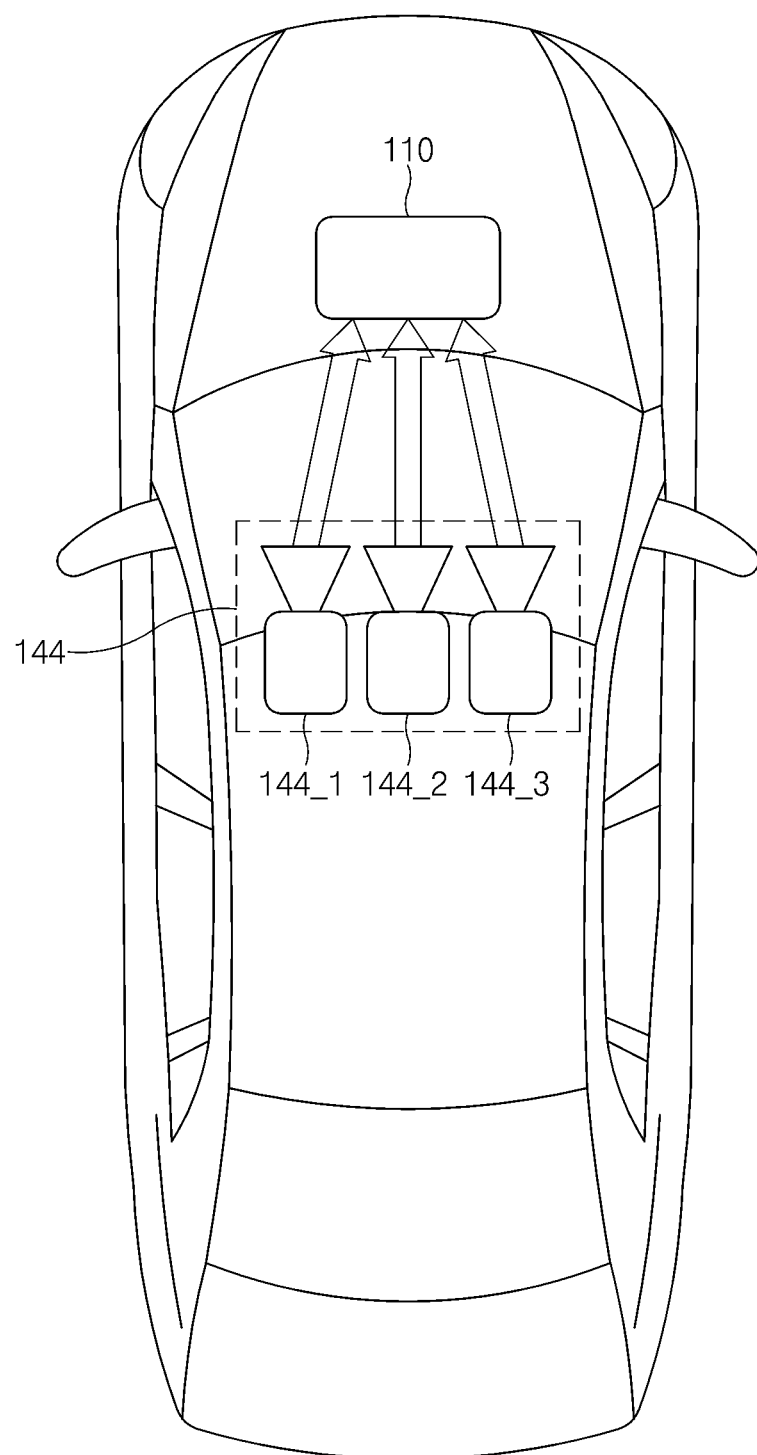
FIG. 2 is a view showing a position at which a camera of a vehicle control system according to one embodiment of the present disclosure is disposed on a vehicle.

FIG. 2 is a view showing the position in which a camera of the vehicle control system according to one embodiment of the present disclosure is disposed on the vehicle.

A camera 144 may include a first camera device 144_1, a second camera device 144_2, and a third camera device 144_3. The first camera device 144_1, the second camera device 144_2, and the third camera device 144_3 may be arranged side by side in a width direction of the vehicle. The first camera device 144_1, the second camera device 144_2, and the third camera device 144_3 may be disposed around a rear view mirror of the vehicle and/or adjacent to a driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) thereof based on differences between positions of the first camera device 144_1, the second camera device 144_2, and the third camera device 144_3. The camera 144 may transmit image data of the external environment as captured to the processor 110.

Figure 3:
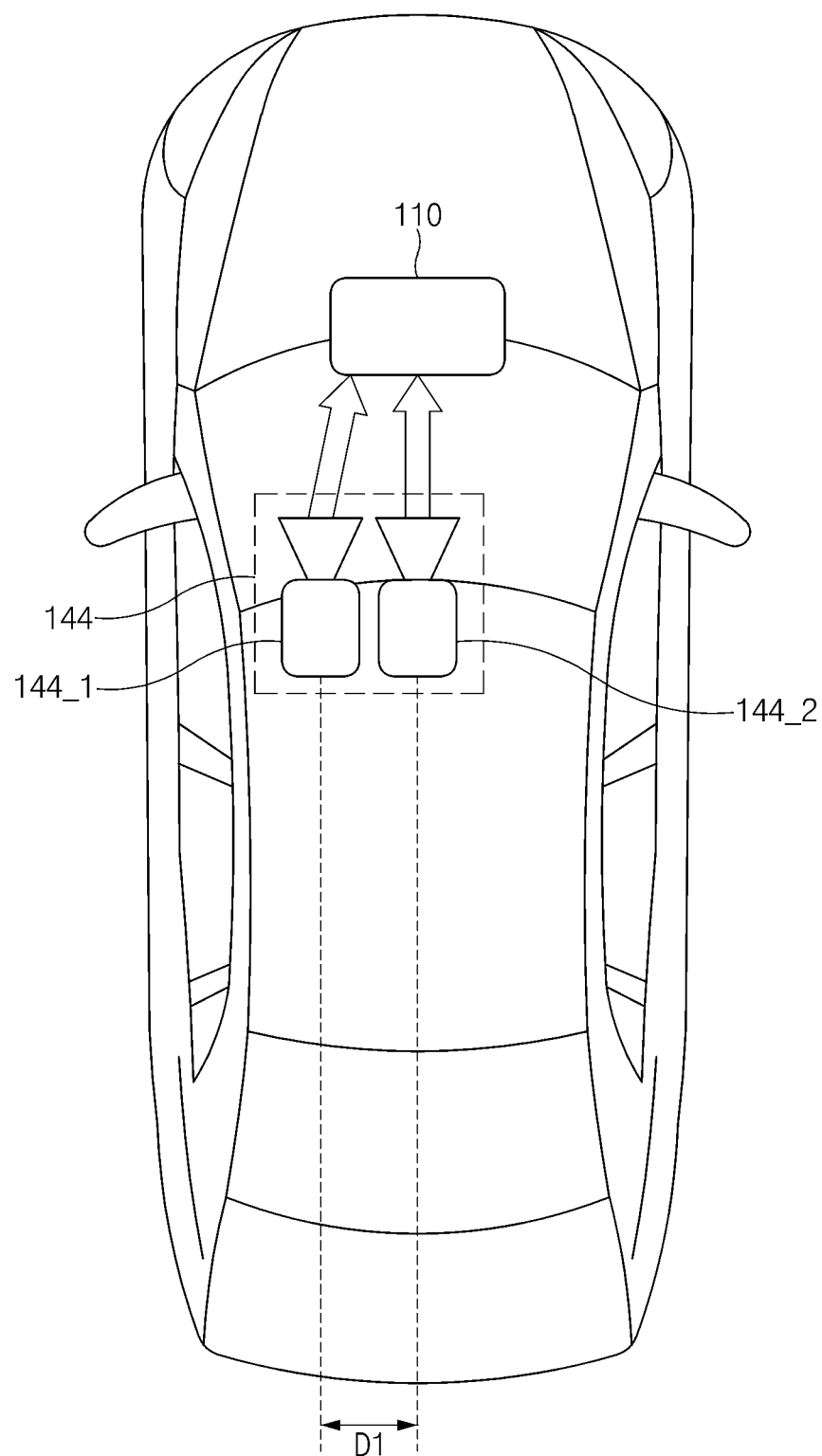
FIG. 3 is a view showing a position at which a camera of a vehicle control system according to one embodiment of the present disclosure is disposed on a vehicle.

FIG. 3 is a view showing a position in which a camera of the vehicle control system according to one embodiment of the present disclosure is disposed on the vehicle.

The camera 144 may include the first camera device 144_1 and the second camera device 144_2. The first camera device 144_1 and the second camera device 144_2 may be arranged side by side in the width direction of the vehicle. The first camera device 144_1 and the second camera device 144_2 may be arranged around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a first distance D1 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 4:
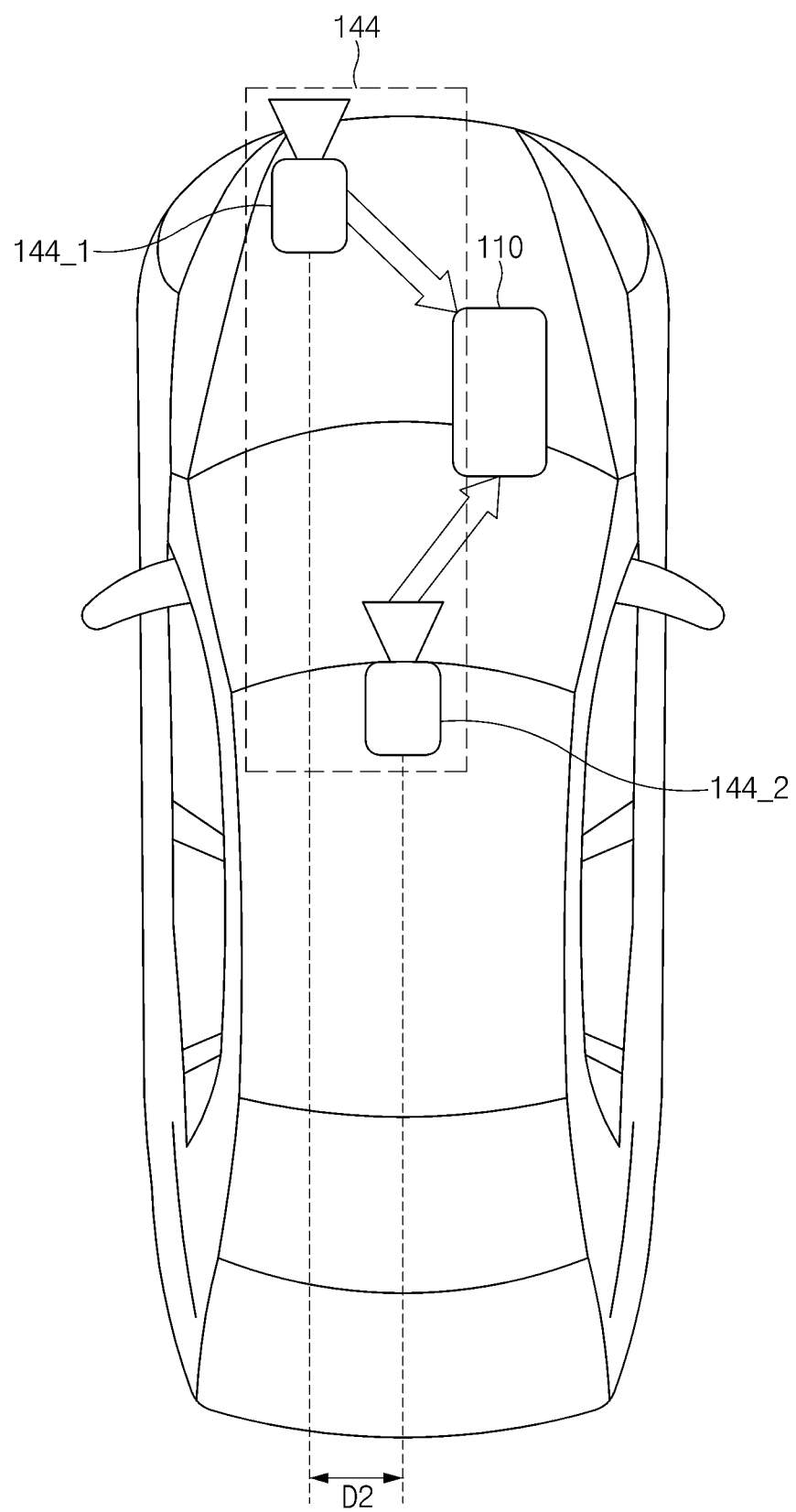
FIG. 4 is a view showing a position at which a camera of a vehicle control system according to one embodiment of the present disclosure is disposed on a vehicle.

FIG. 4 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 may be disposed above a bumper area of the vehicle or inside the bumper area. The first camera device 144_1 may be disposed adjacent to any one of corners of the bumper area. The second camera device 144_2 may be disposed around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a second distance D2 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 5:
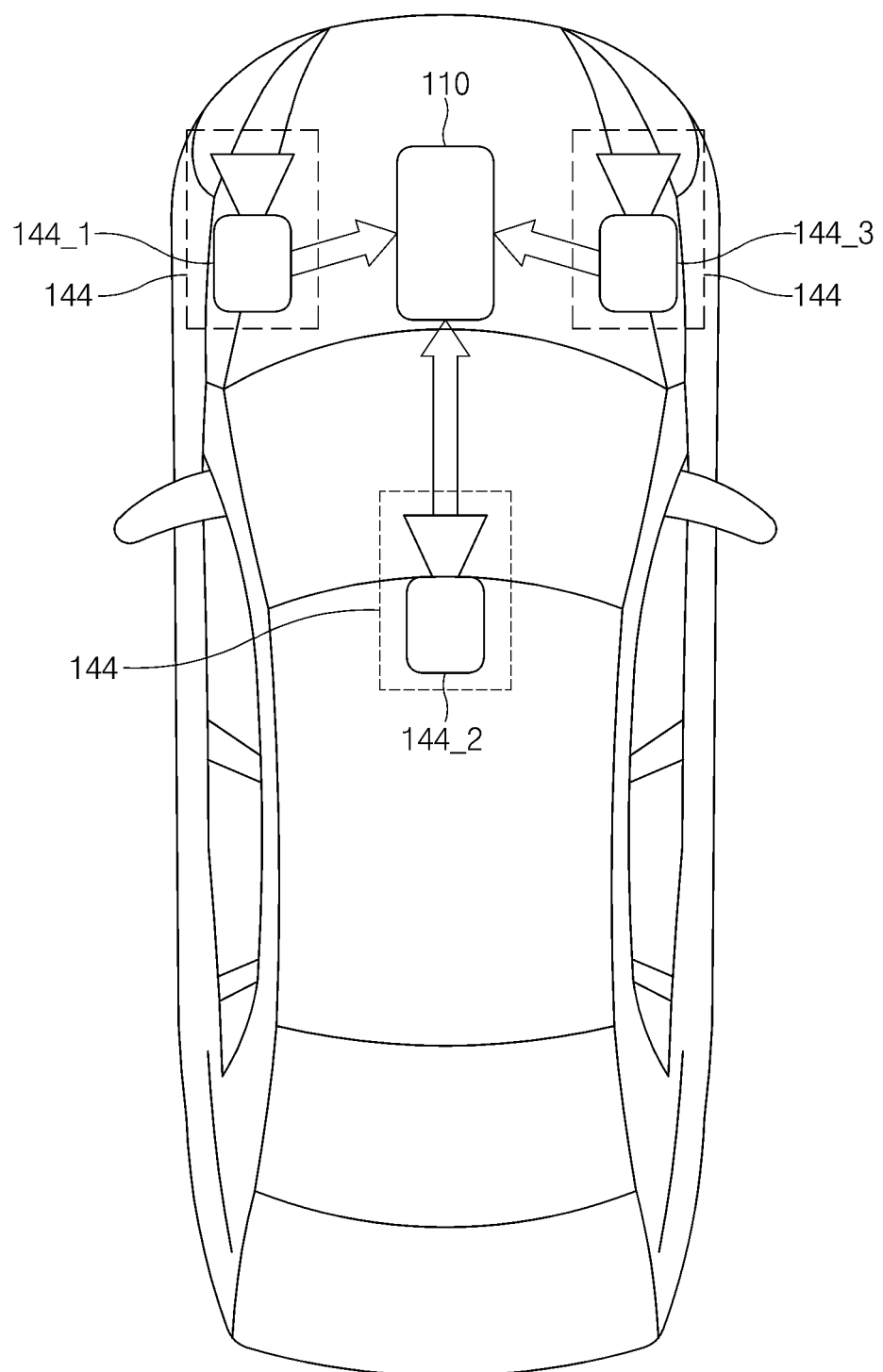
FIG. 5 is a view showing a position in which a camera of a vehicle control system according to one embodiment of the present disclosure is disposed on a vehicle.

FIG. 5 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 and the third camera device 144_3 may be disposed above or inside the bumper area of the vehicle. The first camera device 144_1 may be disposed adjacent to any one of the corners of the bumper area. The third camera device 144_3 may be disposed adjacent to a corner of the bumper area except for the corner where the first camera device 144_1 is disposed. The second camera device 144_2 may be disposed around the rear view mirror of the vehicle and/or adjacent to the driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) based on differences between positions of the first camera device 144_1, the second camera device 144_2, and the third camera device 144_3. The camera 144 may transmit the image data of the external environment as captured to the processor 110.

Figure 6:
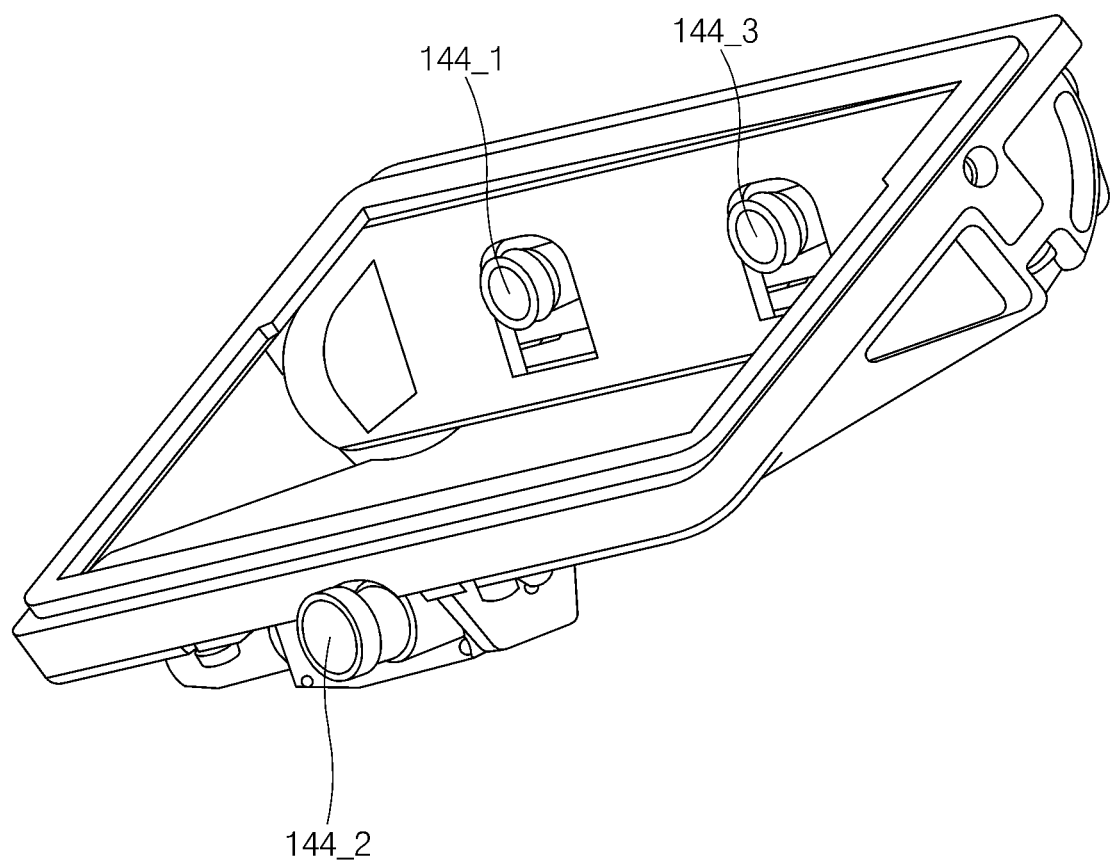
FIG. 6 is a view showing a plurality of camera devices of a vehicle control system according to one embodiment of the present disclosure.

FIG. 6 is a view showing a plurality of camera devices of the vehicle control system according to one embodiment of the present disclosure.

Figure 7:
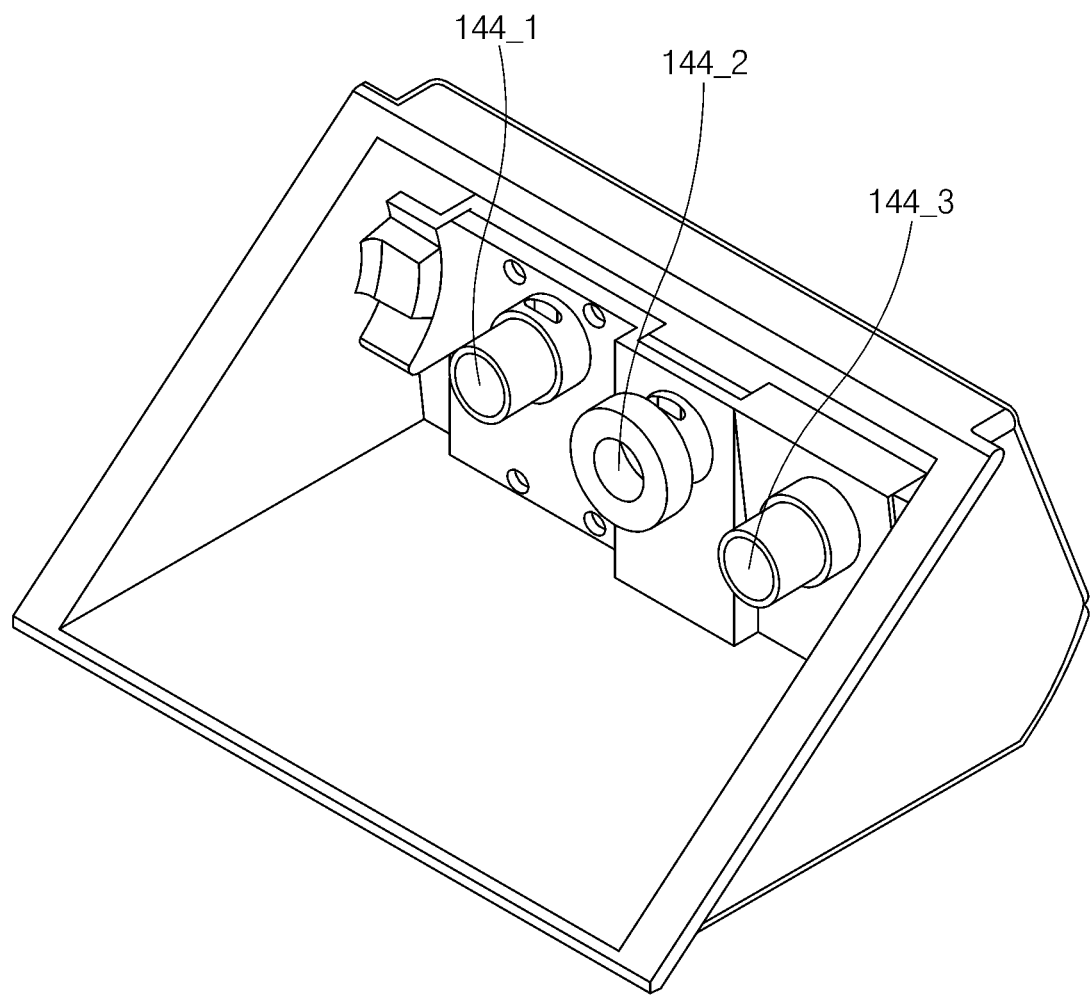
FIG. 7 is a view showing a plurality of camera devices of a vehicle control system according to one embodiment of the present disclosure.

The plurality of camera devices may include the first camera device 144_1, the second camera device 144_2, and the third camera device 144_3. FIG. 7 is a view showing a plurality of camera devices of a vehicle control system according to one embodiment of the present disclosure. The plurality of camera devices may include the first camera device 144_1, the second camera device 144_2, and the third camera device 144_3.

Each of the first camera device 144_1, the second camera device 144_2, and the third camera device 144_3 may include an image capture device of an appropriate type. The image capture device may include an optical axis. The image capture device may include an APTINA® M9V024 WVGA sensor of a global shutter scheme. The image capture device may provide a resolution of 1280×960 pixels and may include a rolling shutter scheme. The image capture device may include a variety of optical elements. The image capture device may include at least one lens to provide a focal length and a field of view (FOV) required by the image capture device. The image capture device may be combined with a 6 mm lens or a 12 mm lens.

Each of the first camera device 144_1, the second camera device 144_2, and the third camera device 144_3 may have a designated field of view (FOV) angular range. Each of the first camera device 144_1, the second camera device 144_2, and the third camera device 144_3 may have a general field of view (FOV) angular range of 40 degrees or greater and 56 degrees or smaller. Each of the first camera device 144_1, the second camera device 144_2, and the third camera device 144_3 may have a narrow field of view (FOV) angular range of 23 degrees or greater and 40 degrees or smaller. Each of the first camera device 144_1, the second camera device 144_2, and the third camera device 144_3 may have a wide FOV (field of view) angular range of 100 degrees or greater and 180 degrees or smaller. Each of the first camera device 144_1, the second camera device 144_2, and the third camera device 144_3 may include a wide-angle bumper camera or a camera capable of securing up to a 180-degree field of view (FOV). The field of view (FOV) of the first camera device 144_1 may be wider, narrower, or partially overlapping than the field of view (FOV) of the second camera device 144_2.

A 7.2 megapixel image capture device with an aspect ratio of about 2:1 (e.g., H×V=3800×1900 pixels) and a horizontal field of view (FOV) of about 100 degrees may replace a configuration of a plurality of camera device composed of the first camera device 144_1, the second camera device 144_2, and the third camera device 144_3. A vertical field of view (FOV) of a megapixel image capture device using a radially symmetrical lens may be realized to be 50 degrees or smaller due to lens distortion. A radially asymmetric lens may be used to achieve a vertical field of view (FOV) of 50 degrees or greater for a horizontal field of view (FOV) of 100 degrees.

A driving support function may be provided using a multi-camera system including a plurality of camera devices. The multi-camera system may use at least one camera facing in a front direction of the vehicle. In the multi-camera system, at least one camera may face in a side direction or a rear direction of the vehicle. The multi-camera system may be configured so that the first camera device 144_1 and the second camera device 144_2 face in the front direction and/or the side direction of the vehicle using a dual-camera imaging system.

The multi-camera systems including the plurality of camera devices may employ a triple camera imaging system in which FOVs (field of view) of the first camera device 144_1, the second camera device 144_2, and the third camera device 144_3 are different from each other. The triple-camera imaging system may perform determinations based on information obtained from objects positioned at various distances in the front and side directions of the vehicle.

The first camera device 144_1 may be connected to a first image processor to perform monocular image analysis of an image provided by the first camera device 144_1. The second camera device 144_2 may be connected to a second image processor to perform monocular image analysis of an image provided by the second camera device 144_2. Information processed and output by the first and the second image processors may be combined with each other. The second image processor may receive images from both the first camera device 144_1 and the second camera device 144_2 and perform three-dimensional analysis thereon. Monocular image analysis may mean image analysis performed based on an image captured from a single field of view (e.g., an image captured by a single camera). The three-dimensional image analysis may mean image analysis performed based on two or more images captured with at least one image capture parameter (e.g., images captured respectively by at least two cameras). Captured images suitable for three-dimensional image analysis may include images captured from at least two positions, images captured from different fields of views (FOV), images captured using different focal lengths, and images captured based on parallax information.

Figure 8:
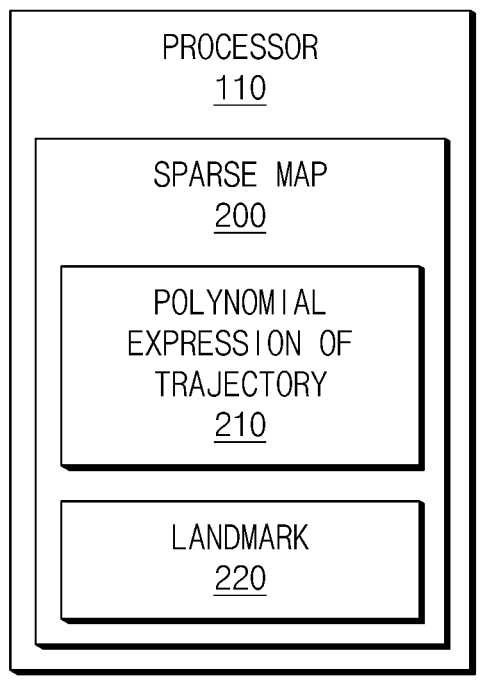
FIG. 8 is a block diagram showing a sparse map of a processor according to one embodiment of the present disclosure.

FIG. 8 is a block diagram showing a sparse map of a processor according to one embodiment of the present disclosure.

The processor 110 may include a sparse map 200. The sparse map 200 may be used for autonomous driving. The sparse map 200 may provide information for navigation of autonomous driving vehicles. The sparse map 200 and the data processed by the sparse map 200 may be stored in a memory of the vehicle control system or may be transmitted/received to/from a remote server. The sparse map 200 may store therein and use a polynomial expression of at least one trajectory along which the vehicle travels on a road. In the sparse map 200, a feature of a road section may be simplified and may be recognized as an object. The sparse map 200 may reduce an amount of data stored and transmitted/received for autonomous driving vehicle navigation. The sparse map 200 may include a polynomial expression 210 of a trajectory and a landmark 220.

The polynomial expression 210 of the trajectory may be a polynomial expression of a target trajectory for guiding autonomous driving along a road section. The target trajectory may represent an ideal route for a vehicle to travel in a road section. The road section may be expressed with at least one target trajectory. The number of target trajectories may be smaller than the number of a plurality of lines included in the road section. A vehicle operating on a road may determine navigation in consideration of a line corresponding to the target trajectory and a line offset using one of the target trajectories.

The landmark 220 may be a place or a mark associated with a specific road section or a local map. The landmark 220 may be identified and stored in the sparse map 200. A spacing between landmarks 220 may be adjusted. The landmark 220 may be used for autonomous driving navigation. The landmark 220 may be used to determine the vehicle's current position with respect to the stored target trajectory. An autonomous driving vehicle may adjust a travel direction at a current position so as to coincide with a direction of the target trajectory using the vehicle's current position information.

The landmark 220 may be used as a reference point for determining a position of the vehicle with respect to the target trajectory. While the vehicle drives based on dead reckoning in which the vehicle determine its itself-movement and estimates its position with respect to the target trajectory, the vehicle may eliminate an error in a position determination due to the dead reckoning, using a position of the landmark 220 that appears in the sparse map 200. The landmark 220 identified in the sparse map 200 may act as an anchor to allow the vehicle to accurately determine the vehicle's position with respect to the target trajectory.

Figure 9:
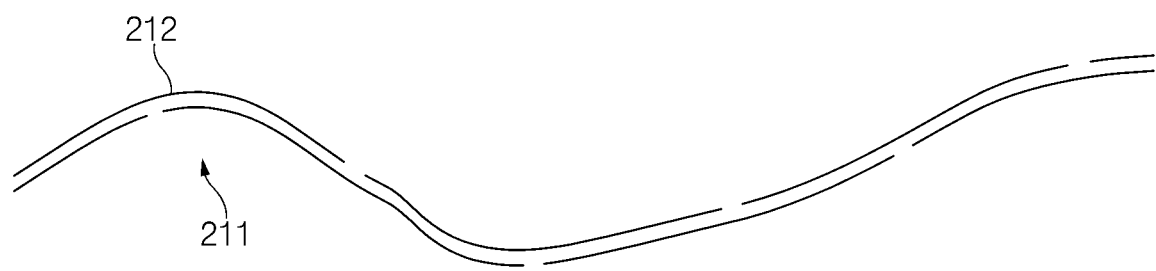
FIG. 9 is a diagram showing a polynomial expression of a trajectory according to one embodiment of the present disclosure.

FIG. 9 is a diagram showing the polynomial expression of the trajectory according to one embodiment of the present disclosure.

The sparse map may include information about a feature of a road. The sparse map may store therein a curved shape in sections 212 included in a road 211. Each of the sections 212 may have a curved shape that may be expressed as a polynomial. The road 211 may be modeled as a three-dimensional polynomial expression as a combination of the curved shapes of the lines, each line including left and right sides. A plurality of polynomials may be used to express a position and a shape of the road 211 and each of the sections 212 included in the road 211. A polynomial expressing each of the sections 212 may define a position and a shape of the section 212 within a specified distance.

Figure 10:
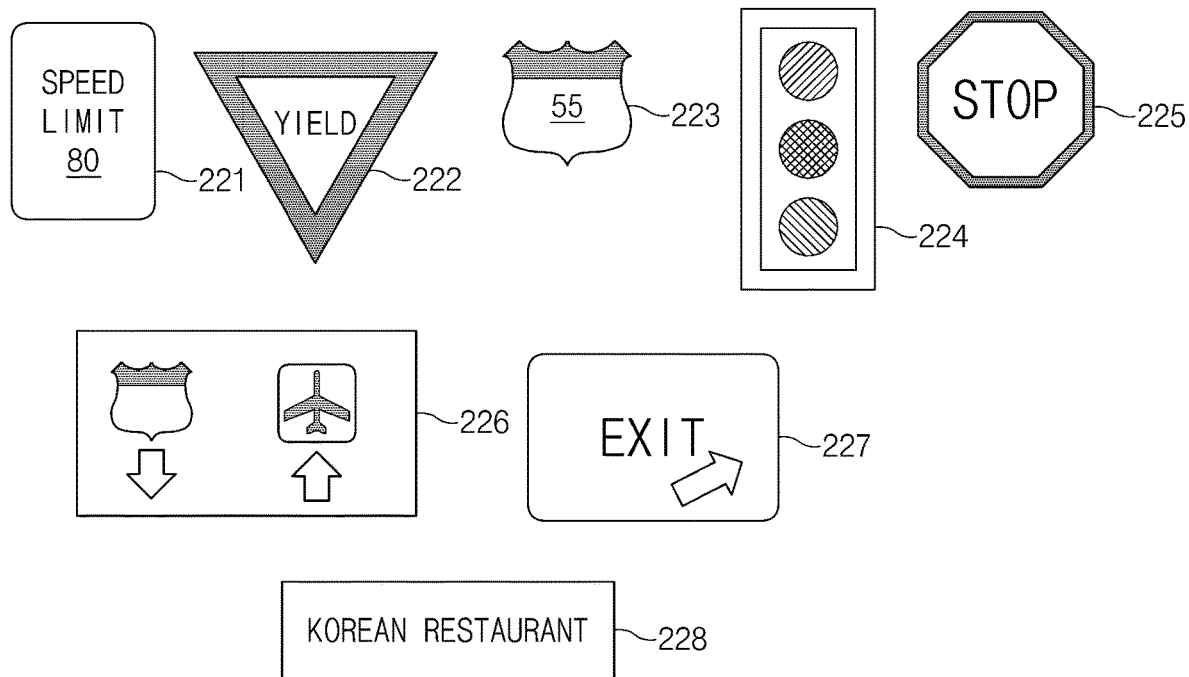
FIG. 10 is a diagram showing a landmark according to one embodiment of the present disclosure.

FIG. 10 is a diagram showing a landmark according to one embodiment of the present disclosure.

The landmarks may include a traffic sign plate, a direction indication sign plate, roadside facilities, and a general sign plate. The traffic sign plate may be a sign plate that guides traffic conditions and regulations to be observed during driving. The traffic sign plate may include a speed limit sign plate 221, a yield sign plate 222, a road number sign plate 223, a traffic signal sign plate 224, and a stop sign plate 225. The direction indication sign plate may be a sign plate with at least one arrow indicating at least one direction to another location. The direction indication sign plate may include a highway sign plate 226 with an arrow guiding the vehicle to another road or location and an exit sign plate 227 with an arrow guiding the vehicle out of the road. The general sign plate may be a sign plate that provides information related to a place. The general sign plate may include a signboard 228 of a famous restaurant in an area.

The sparse map may include a plurality of landmarks related to the road section. A simplified image of an actual image of each landmark may be stored in the sparse map. The simplified image may be composed of data depicting a feature of the landmark. The image stored in the sparse map may be expressed and recognized using a smaller amount of data than an amount of data required by the actual image. Data representing the landmark may include information to depicting or identify the landmark formed along the road.

Figure 11:
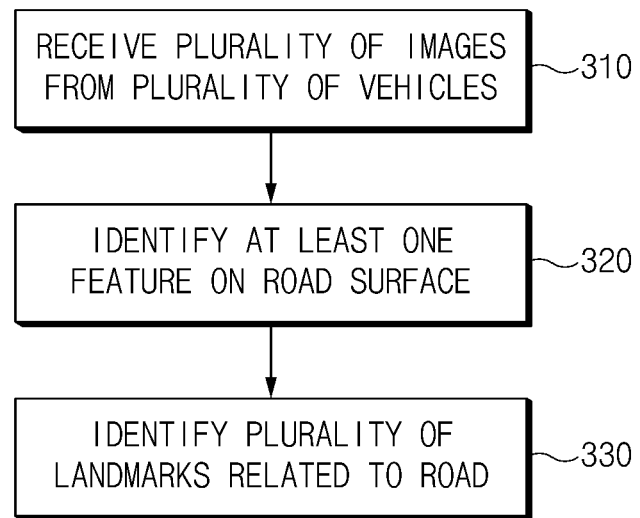
FIG. 11 is a flowchart showing a method in which a vehicle control system according to one embodiment of the present disclosure generates a sparse map.

FIG. 11 is a flowchart showing a method of generating a sparse map according to one embodiment of the present disclosure.

The vehicle control system may receive a plurality of images from a vehicle in operation 310. Each of the plurality of cameras disposed on the vehicle may image a vehicle surrounding situation which the vehicle faces while driving along the road section and thus may capture a plurality of images showing the vehicle surrounding situation. The plurality of images showing the vehicle surrounding situation may show a shape and a situation of the vehicle's travel route. The vehicle control system may receive the plurality of images captured by the plurality of cameras.

The vehicle control system may identify at least one feature on a road surface in operation 320. The vehicle control system may simplify a feature of the road surface running along the road section as a representation of at least one line, based on the plurality of images. The simplified line representation of the feature of the road surface may represent a route along the road section substantially corresponding to the road surface feature. The vehicle control system may analyze the plurality of images received from the plurality of cameras to identify an edge or a lane mark of a road. The vehicle control system may determine a travel trajectory following a road section associated with the edge of the road or the lane mark thereof. A trajectory or line representation may include a spline, a polynomial expression, or a curve. The vehicle control system may determine the vehicle's travel trajectory based on the camera's itself-movement, such as 3D translation and/or 3D rotational movement.

The vehicle control system may identify a plurality of landmarks related to the road in operation 330. The vehicle control system may analyze the plurality of images received from the camera to identify at least one landmark on the road section. The landmarks may include the traffic sign plate, the direction indication sign plate, the roadside facilities, and the general sign plate. The analysis may include a rule for admitting and rejecting a determination that the landmark may be a landmark related to a road section. The analysis may include a rule in which when a ratio of images in which the landmark appears to images in which no landmark appears exceeds a threshold value, the determination that the landmark may be a landmark related to a road section is admitted, and a rule in which when a ratio of images in which no landmark appears to images in which the landmark appears exceeds a threshold value, the determination that the landmark may be a landmark related to a road section is rejected.

Figure 12:
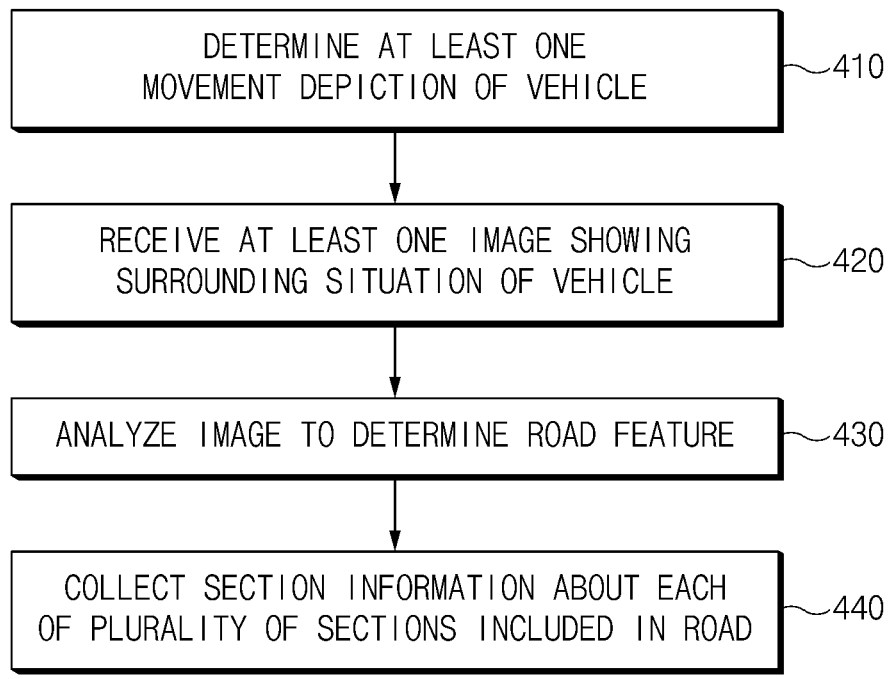
FIG. 12 is a flowchart showing a method for anonymizing navigation information by a vehicle control system according to one embodiment of the present disclosure.

FIG. 12 is a flowchart showing a method in which the vehicle control system according to one embodiment of the present disclosure anonymize navigation information.

The vehicle control system may determine at least one movement depiction of the vehicle in operation 410. The vehicle control system may determine at least one movement depiction based on an output value of the sensor. At least one movement description may include any indicator of the vehicle's movement. For example, at least one movement depiction may include an acceleration of the vehicle, a speed of the vehicle, longitudinal and transversal positions of the vehicle at a specific time, a three-dimensional position of the vehicle, and a determined trajectory of the vehicle.

At least one movement depiction may include the vehicle's itself-movement depiction in a predetermined coordinate system. The itself-movement may include rotation, translation, or movement in a transverse direction, longitudinal direction, or other directions of the vehicle. The vehicle's itself-movement may be expressed using a speed, a yaw rate, a tilt or a roll of the vehicle. A self-movement depiction of the vehicle may be determined on a given level of freedom.

The vehicle control system may receive at least one image showing the surrounding situation of the vehicle in operation 420. The vehicle control system may receive, from the camera, an image of the road on which the vehicle is driving and an image of a surrounding around the vehicle.

The vehicle control system may analyze the image to determine a road feature in operation 430. The vehicle control system may analyze at least one image according to a command stored in the image analysis module, or utilize a learning system such as a neural network to determine at least one road feature. At least one road feature may include a road feature such as a median line of the road, an edge of the road, a landmark along the road, a pothole on the road, a turn of the road, or the like. At least one road feature may include a lane feature including an indicator indicating at least one of lane separation, lane merging, dashed-line lane indication, solid-line lane indication, a road surface color in a lane, a line color, a lane direction, or a lane type regarding a lane as detected. The lane feature may include a determination that the lane is a HOV (High-Occupancy Vehicles) lane and a determination that the lane is separated from another lane by a solid line. At least one road feature may include an indicator of a road edge. The road edge may be determined based on a detected barrier along the road edge, a detected sidewalk, a line indicating an edge, a road boundary stone along the road edge, or based on detection of an object along the road.

The vehicle control system may collect section information about each of a plurality of sections included in the road in operation 440. The vehicle control system may divide the road into the plurality of sections. The vehicle control system may combine each of the plurality of sections with the road feature to collect the section information about each of the plurality of sections. The section information may include at least one movement depiction of the vehicle and/or at least one road feature relative to the section of the road. The vehicle control system may collect the section information including the movement depiction calculated in operation 410 and the road feature determined in operation 430.

Figure 13:
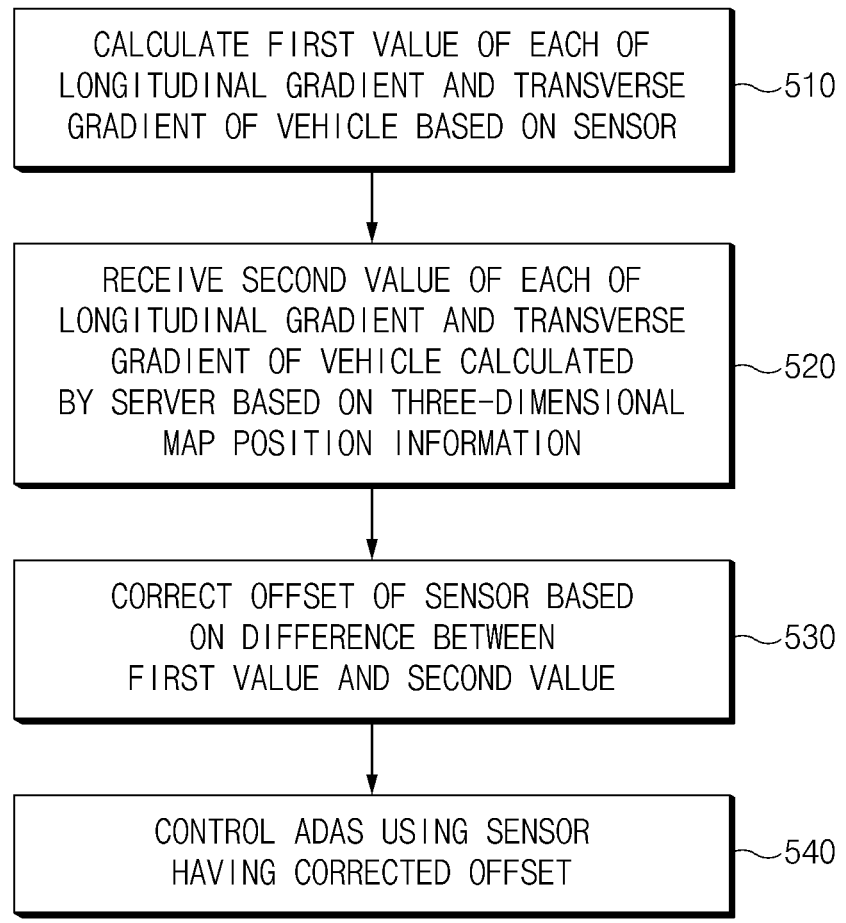
FIG. 13 is a flowchart showing a method in which a vehicle control system according to one embodiment of the present disclosure corrects an offset of a sensor using a longitudinal gradient and a transverse gradient.

FIG. 13 is a flowchart showing a method in which a vehicle control system according to one embodiment of the present disclosure corrects an offset of a sensor using a longitudinal gradient and a transverse gradient.

The vehicle control system may calculate a first value of each of the longitudinal gradient and the transverse gradient of the vehicle based on the sensor in operation 510. The vehicle control system may calculate the longitudinal gradient value and the transverse gradient value at a corresponding position using an acceleration sensor in the longitudinal direction and the transverse direction of the vehicle. The vehicle control system may calculate the longitudinal gradient value and the transverse gradient value additionally using a wheel speed sensor and/or a yaw rate sensor. When constructing a three-dimensional map, the vehicle control system may use the vehicle's sensor to determine the longitudinal gradient and the transverse gradient to increase accuracy of the three-dimensional map construction.

The vehicle control system may receive a second value of each of the longitudinal gradient and the transverse gradient of the vehicle calculated by a server based on three-dimensional map position information in operation 520. The server may collect data about gradient information of a three-dimensional map from a plurality of vehicles. The server may collect data on the gradient information of the three-dimensional map from the plurality of vehicles and calculate the second value of each of the longitudinal gradient and the transverse gradient based on the collected data. The vehicle control device may receive the second value of each of the vehicle's longitudinal gradient and transverse gradient from the server.

The vehicle control system may correct an offset of the sensor based on a difference between the first value and the second value in operation 530. In order to calibrate the acceleration sensor, a reference value or an error value may be used. The reference value or the error value may not easily be obtained on the actual road. The reference value or the error value may be obtained using a difference from the three-dimensional map position information. The vehicle control system may correct the offset of the acceleration sensor using differences between the longitudinal gradient value and the transverse gradient value obtained using the sensor, and the longitudinal gradient value and the transverse gradient value obtained using the three-dimensional map position information.

The vehicle control system may control ADAS (Advanced Driver Assistant System) using the sensor having the corrected offset in operation 540. The ADAS may control vehicle driving using information related to the vehicle's longitudinal gradient and transverse gradient. The vehicle control system may correct the offset of the sensor and control the ADAS using the corrected sensor that calculates an accurate longitudinal gradient value and an accurate transverse gradient value to improve accuracy of the ADAS.

Figure 14:
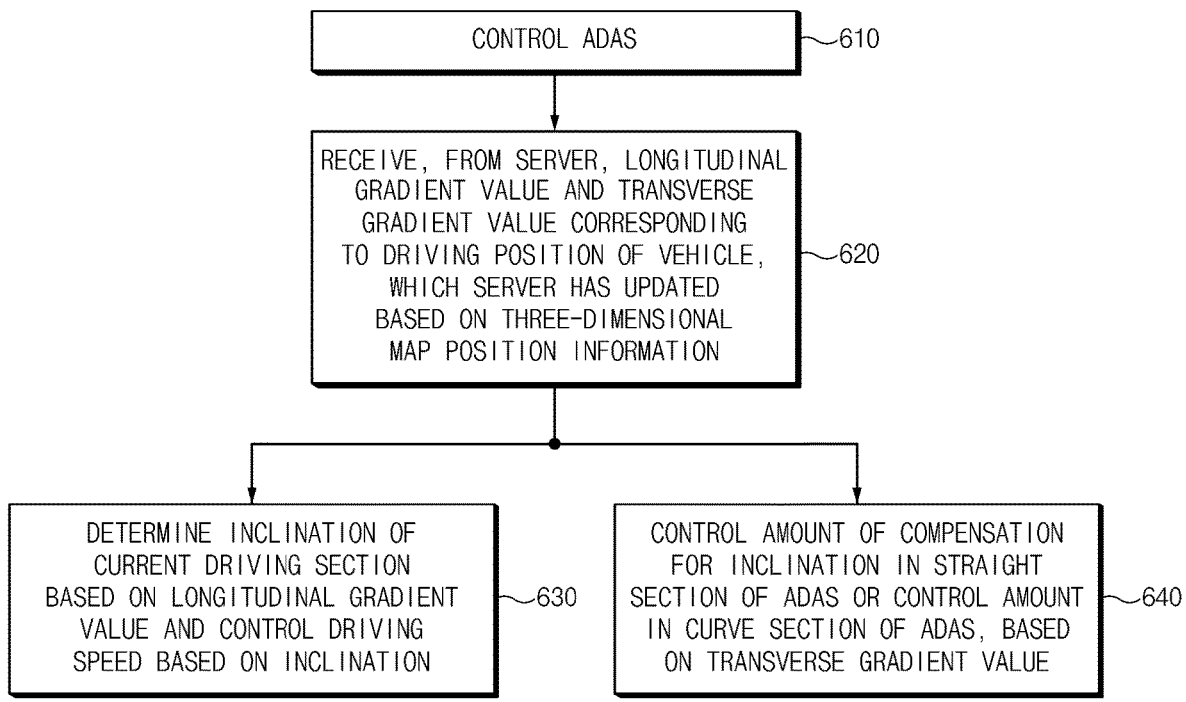
FIG. 14 is a flowchart showing a method in which a vehicle control system according to one embodiment of the present disclosure controls a driving speed and a gradient amount using a longitudinal gradient and a transverse gradient.

FIG. 14 is a flowchart showing a method in which a vehicle control system according to one embodiment of the present disclosure controls a driving speed and a gradient amount using a longitudinal gradient and a transverse gradient.

The vehicle control system may control the ADAS in operation 610. When controlling the ADAS, the vehicle control system may calculate the longitudinal gradient value and the transverse gradient value of the vehicle using a sensor provided in each of the plurality of vehicles.

The vehicle control system may receive, from the server, a longitudinal gradient value and a transverse gradient value corresponding to a driving position of the vehicle, which the server has updated based on the three-dimensional map position information in operation 620. The longitudinal gradient value and the transverse gradient value corresponding to the driving position of the vehicle may be updated based on three-dimensional map position information. The vehicle control system may update an average value of longitudinal gradient values and an average value of transverse gradient values of the plurality of vehicles when constructing a three-dimensional map.

The vehicle control system may determine an inclination of a current travel section based on the longitudinal gradient value and control the driving speed based on the inclination in operation 630. The vehicle control system may determine whether a current section is an uphill or downhill section in the longitudinal direction. The vehicle control system may control a force for driving used to maintain the driving speed depending on whether the current section is the uphill or downhill section in the longitudinal direction. The vehicle control system may increase the force for driving used to maintain the driving speed when the current section is the uphill section in the longitudinal direction. The vehicle control system may decrease the force for driving used to maintain the driving speed when the current section is the downhill section in the longitudinal direction.

The vehicle control system may control an amount of compensation for pulling in a straight section of the ADAS or a control amount in a curve section of the ADAS, based on the transverse gradient value in operation 640. The vehicle control system may control a relative position of the vehicle on a line based on the transverse gradient value. The vehicle control system may control the vehicle to be positioned in the median in the straight section based on the transverse gradient value. The vehicle control system may control a curvature of the route along which the vehicle is driving in the curve section, based on the transverse gradient value.

Figure 15:
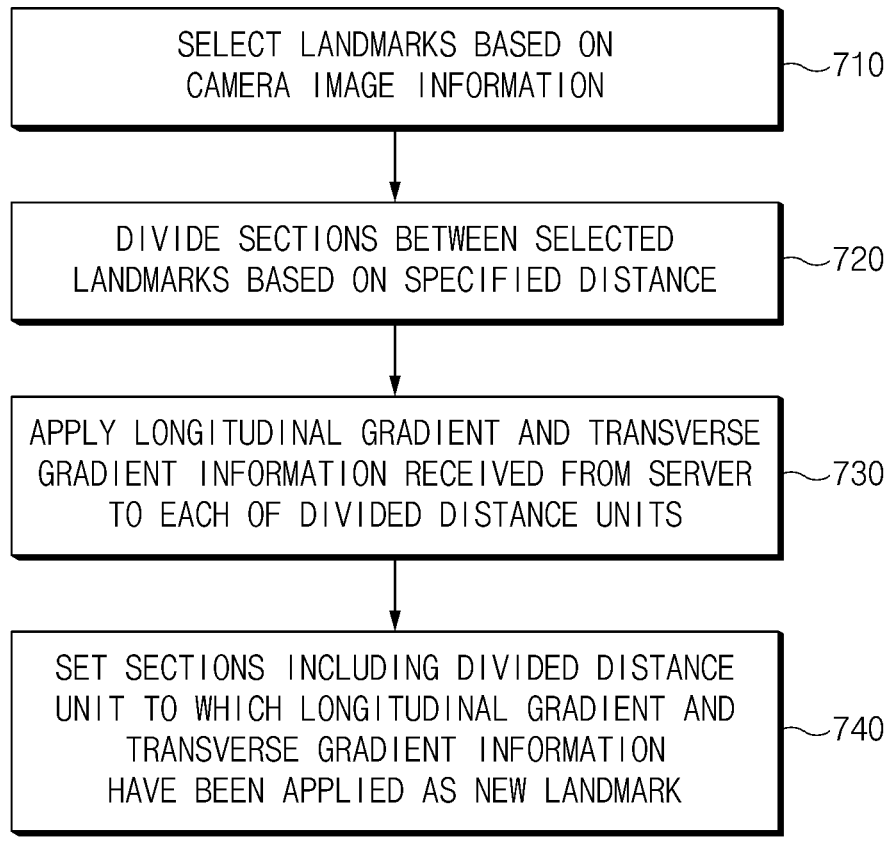
FIG. 15 is a flowchart showing a method in which a vehicle control system according to one embodiment of the present disclosure sets a landmark based on longitudinal gradient information and transverse gradient information.

FIG. 15 is a flowchart showing a method in which a vehicle control system according to one embodiment of the present disclosure sets a landmark based on longitudinal gradient information and transverse gradient information.

The vehicle control system may select landmarks based on camera image information in operation 710. The vehicle control system may select the existing landmarks and at the same time, calculate the longitudinal gradient and the transverse gradient using the vehicle's sensor. The vehicle control system may transmit the calculated longitudinal gradient value and transverse gradient value to the server. The server may calculate an average value of the longitudinal gradient values and an average of the transverse gradient values. The server may update the average value of the longitudinal gradient values and the average value of the transverse gradient values in the three-dimensional map position information.

The vehicle control system may divide sections between the selected landmarks into divided distance units based on a specified distance in operation 720. The vehicle control system may receive the three-dimensional map position information in which the average value of the longitudinal gradient values and the average value of the transverse gradient values have been updated. The vehicle control system may divide the section between the landmarks into a unit length having the specified distance, based on the average value of the longitudinal gradient values and the average value of the transverse gradient values.

The vehicle control system may apply longitudinal gradient and transverse gradient information received from the server to each of the divided distance units in operation 730. When the longitudinal gradient and the transverse gradient are applied thereto, a composition of the three-dimensional map may be increased. The vehicle control system may apply the longitudinal gradient and transverse gradient information to each unit length having the specified distance.

The vehicle control system may set one or more sections that include the divided distance unit to which the longitudinal gradient and transverse gradient information have been applied as one or more new landmarks in operation 740. The vehicle control system may sequence longitudinal gradient and transverse gradient ratios based on a certain distance between landmarks and may set the sequencing result as a new landmark with a feature. As the number of the landmarks with features increases, the 3D map may be more accurate and reliable. The vehicle control system may set a distance between landmarks including the gradient ratios as a new landmark in addition to the existing landmarks, thereby increasing the accuracy and reliability of the three-dimensional map.

Figure 16:
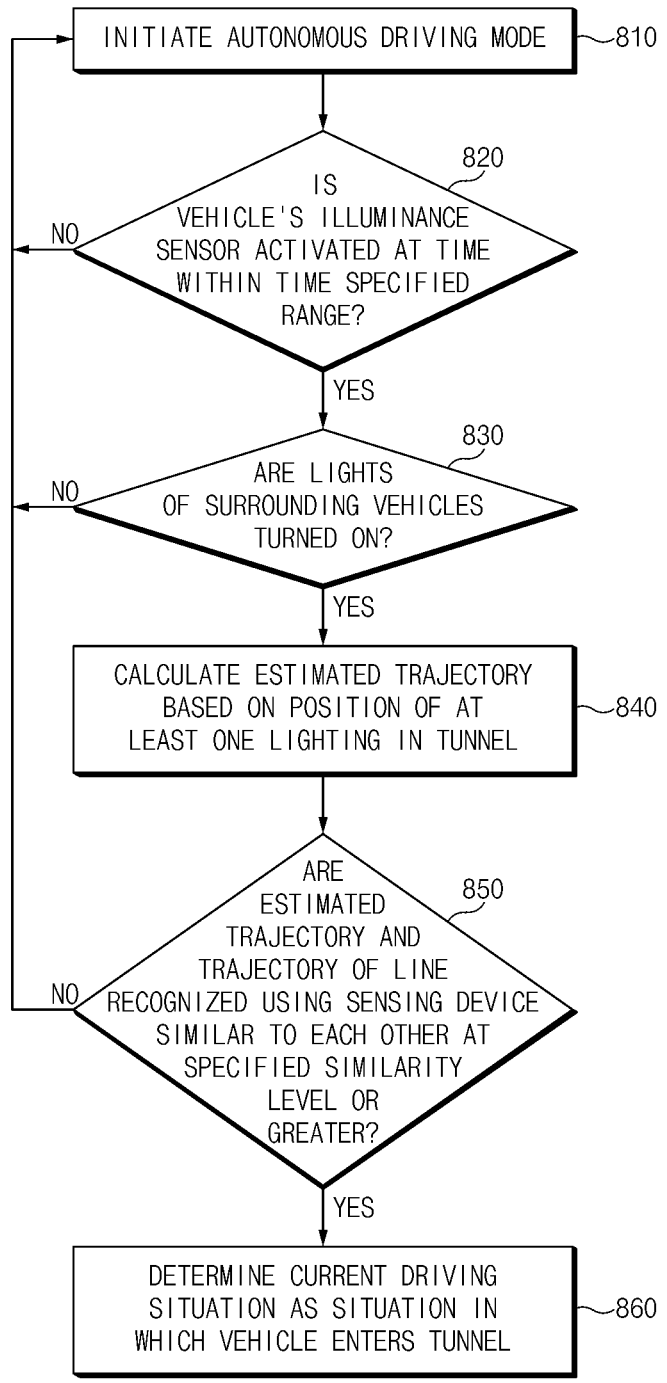
FIG. 16 is a flowchart showing a method in which a vehicle control system according to one embodiment of the present disclosure sets an entrance of a tunnel as a landmark.

FIG. 16 is a flowchart showing a method in which the vehicle control system according to one embodiment of the present disclosure sets an entrance of a tunnel as a landmark.

The vehicle control system may initiate the autonomous driving mode in operation 810. In the autonomous driving mode, as the 3D map has the increasing number of landmarks with features, reliability and usefulness of the map may increase.

The vehicle control system may identify whether the vehicle's illuminance sensor is activated at a time within a time specified range in operation 820. The specified time range may be daytime. The vehicle control system may proceed to operation 830 when the vehicle's illuminance sensor is activated at a time within the specified time range (operation 820—Yes). When the vehicle's illuminance sensor is not activated at a time within the specified time range (operation 820—No), the vehicle control system may determine that current diving is normal vehicle driving and may return to operation 810.

The vehicle control system may identify whether lights of surrounding vehicles are turned on in operation 830. The vehicle control system may proceed to operation 840 when the lights of the surrounding vehicles are turned on (operation 830—Yes). When the lightings of the surrounding vehicles are turned off (operation 830—No), the vehicle control system may determine that the illuminance sensor of the own vehicle is turned on due to a temporary cause and may return to operation 810.

The vehicle control system may calculate an estimated trajectory based on a position of at least one lighting in the tunnel in operation 840. The vehicle control system may calculate an Equation representing a trajectory connecting the lightings in the tunnel with each other as a line Equation corresponding to the estimated trajectory.

The vehicle control system may identify similarity between the estimated trajectory and a trajectory of a line recognized using the sensing device in operation 850. The vehicle control system may proceed to operation 860 when the estimated trajectory and the trajectory of the line recognized using the sensing device are similar to each other at a specified similarity level or greater (operation 850—Yes). When the similarity between the estimated trajectory and the trajectory of the line recognized using the sensing device is smaller than the specified similarity level (operation 850—No), the vehicle control system may determine that, due to a temporary cause that occurs during the driving, the surroundings are temporarily darkened, so that the illuminance sensor of the own vehicle and the lightings of the surrounding vehicles are turned on and may return to operation 810.

The vehicle control system may determine a current driving situation as a situation in which the vehicle enters the tunnel in operation 860. When the trajectory based on the line Equation and the trajectory of the line recognized using the sensing device are similar to each other, the vehicle control system may determine that the vehicle enters the tunnel. The vehicle control system may designate a current position as position information of the tunnel entrance in the driving situation where the vehicle enters the tunnel. The vehicle control system may transmit the position information of the tunnel entrance to the server. Because GPS information is poor in the tunnel, it is not easy to determine the exact vehicle position when using only a GPS signal. When the vehicle control system determines that the vehicle is entering the tunnel, the system may set the current position as a feature and may set a vicinity of the tunnel entrance as a landmark. The vehicle control system may set the vicinity of the tunnel entrance as the landmark. The vehicle control system may compose a three-dimensional map by inversely calculating a position based on the GPS signal of the vicinity of the entrance of the tunnel. The vehicle control system may set the vicinity of the tunnel entrance as the landmark and thus the number of the landmarks set when constructing the 3D map may increase, thereby increasing the accuracy and reliability of the 3D map.

Figure 17:
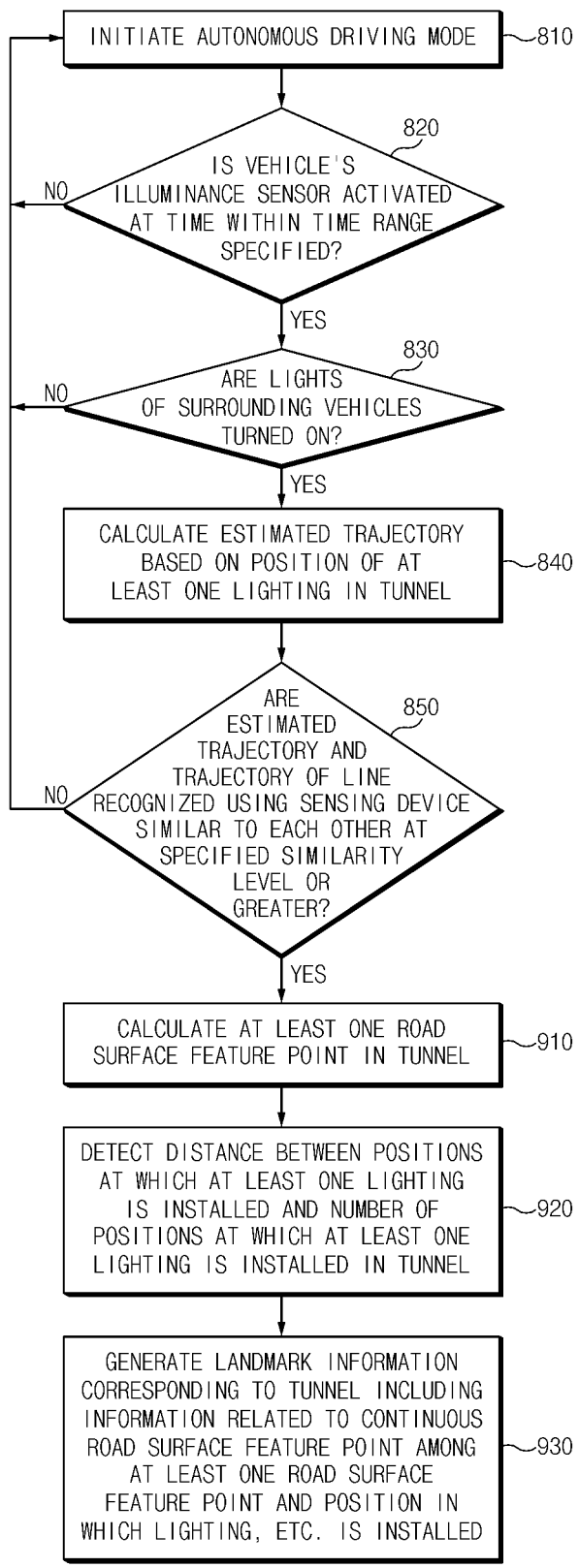
FIG. 17 is a flowchart showing a method in which a vehicle control system according to one embodiment of the present disclosure sets an interior of the tunnel as a landmark.

FIG. 17 is a flowchart showing a method in which the vehicle control system according to one embodiment of the present disclosure sets an interior of the tunnel as a landmark.

The vehicle control system may initiate the autonomous driving mode in operation 810. In the autonomous driving mode, as the 3D map has the increasing number of landmarks with features, the reliability and usefulness of the map may increase.

The vehicle control system may identify whether the vehicle's illuminance sensor is activated at a time within a time range specified in operation 820. The specified time range may be daytime. The vehicle control system may proceed to operation 830 when the vehicle's illuminance sensor is activated at a time within the specified time range (operation 820—Yes). When the vehicle's illuminance sensor is not activated at a time within the specified time range (operation 820—No), the vehicle control system may determine that current diving is normal vehicle driving and may return to operation 810.

The vehicle control system may identify whether lights of surrounding vehicles are turned on in operation 830. The vehicle control system may proceed to operation 840 when the lights of the surrounding vehicles are turned on (operation 830—Yes). When the lightings of the surrounding vehicles are turned off (operation 830—No), the vehicle control system may determine that the illuminance sensor of the own vehicle is turned on due to a temporary cause and may return to operation 810.

The vehicle control system may calculate an estimated trajectory based on a position of at least one lighting in the tunnel in operation 840. The vehicle control system may calculate an Equation representing a trajectory connecting the lightings in the tunnel with each other as a line Equation corresponding to the estimated trajectory.

The vehicle control system may identify similarity between the estimated trajectory and a trajectory of a line recognized using the sensing device in operation 850. The vehicle control system may proceed to operation 860 when the estimated trajectory and the trajectory of the line recognized using the sensing device are similar to each other at a specified similarity level or greater (operation 850—Yes). When the similarity between the estimated trajectory and the trajectory of the line recognized using the sensing device is smaller than the specified similarity level (operation 850—No), the vehicle control system may determine that, due to a temporary cause that occurs during the driving, the surroundings are temporarily darkened, so that the illuminance sensor of the own vehicle and the lightings of the surrounding vehicles are turned on and may return to operation 810.

The vehicle control system may calculate at least one road surface feature point in the tunnel in operation 910. At least one road surface feature point may include a noise level of the road surface and gradient information including a longitudinal gradient and a transverse gradient thereof. The noise level of the road surface may be calculated using the wheel speed sensor.

The vehicle control system may detect a distance between positions at which at least one lighting is installed and the number of positions at which at least one lighting is installed in the tunnel in operation 920. The vehicle control system may store the positions where lightings are installed as coordinate values.

The vehicle control system may generate landmark information corresponding to the tunnel including information related to a continuous road surface feature point among at least one road surface feature point and a position in which lighting, or the like is installed in operation 930. The vehicle control system may store a landmark including the road surface feature point and installation position information of lighting. When the tunnel itself is set as a landmark, the reliability of the 3D map in the tunnel may be improved.

Each step included in the methods described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

The present disclosure improves accuracy of a travel route on which the vehicle is to drive.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle control system comprising:
   a vehicle controller configured to control driving of a vehicle; and
   one or more processors configured to:
   process data related to the driving of the vehicle;
   receive, from a server, information about a longitudinal gradient value and a transverse gradient value corresponding to a position of the vehicle; and
   based on the received information and the processed data related to the driving of the vehicle, control, by the vehicle controller:
   a driving speed of the vehicle;
   an Advanced Driver Assistant System (ADAS) of the vehicle;
   a navigation system of the vehicle; and
   a setting of at least one landmark associated with the vehicle for autonomous driving navigation,
   wherein the at least one landmark is generated based on a sequence of the received longitudinal and transverse gradient values along a travel section of the vehicle.

2. The system of claim 1,
   wherein the one or more processors are configured to:
   control the ADAS;
   determine a slope of a current travel section based on the longitudinal gradient value, and control the driving speed based on the slope; and
   control an amount of compensation for pulling in a straight section or a control amount in a curved section, based on the transverse gradient value.

3. The system of claim 2,
   wherein the one or more processors are further configured to update an average value of the longitudinal gradient value and an average of transverse gradient values of a plurality of vehicles when constructing a three-dimensional map.

4. The system of claim 2,
   wherein the one or more processors are further configured to:
   control a force used for driving the vehicle to maintain the driving speed based on whether the current travel section is longitudinally an uphill or downhill section; and/or
   control a relative position of the vehicle on a lane based on the transverse gradient value.

5. The system of claim 1, further comprising:
   at least one sensor for acquiring data related to the driving of the vehicle and the external environment,
   wherein the information about the longitudinal gradient and the transverse gradient values further includes a second value of each of the longitudinal gradient and the transverse gradient values of the vehicle, and
   wherein the one or more processors are configured to:
   calculate a first value of the longitudinal gradient and the transverse gradient values of the vehicle based on the at least one sensor;
   receive the second value of the longitudinal gradient and the transverse gradient values from the server;
   correct an offset of the at least one sensor based on a difference between the first value and the second value; and
   control the ADAS using the at least one sensor with the corrected offset.

6. The system of claim 5,
   wherein the server is configured to collect data about gradient information of a three-dimensional map from a plurality of vehicles.

7. The system of claim 1, further comprising:
   an imaging device for sensing and imaging the external environment,
   wherein the one or more processors are configured to:
   select a plurality of the at least one landmark based on image information obtained from the imaging device;
   divide sections between the selected plurality of the at least one landmark into divided distance units based on a specified distance;
   apply the information about the longitudinal gradient and the transverse gradient values received from the server to each of the divided distance units; and
   set each section including the divided distance units, wherein the applied gradient values are sequenced, as at least one new landmark.

8. The system of claim 7, further comprising:
   at least one sensor for acquiring data related to the driving of the vehicle from the vehicle and the external environment,
   wherein the one or more processors are configured to select an existing landmark, and calculate the longitudinal gradient and the transverse gradient values using the at least one sensor.

9. The system of claim 7,
   wherein the one or more processors are configured to divide a section between the landmarks into a unit length having the specified distance, based on an average value of longitudinal gradient values and an average value of transverse gradient values.

10. The system of claim 7,
wherein the one or more processors are further configured to sequence longitudinal gradient and transverse gradient ratios based on a certain distance between the landmarks and set the sequencing result as a new landmark with a distinctive feature.

11. A method for driving a vehicle using a vehicle control system, the method comprising:
processing data related to the driving of the vehicle;
receiving information about a longitudinal gradient value and a transverse gradient value corresponding to a position of the vehicle from a server; and
based on the received information and the processed data related to the driving of the vehicle,
controlling a driving speed of the vehicle,
controlling an Advanced Driver Assistant System (ADAS) of the vehicle,
controlling a navigation system of the vehicle, and
controlling a setting of at least one landmark associated with the vehicle for autonomous driving navigation,
wherein the at least one landmark is generated based on a sequence of the received longitudinal and transverse gradient values along a travel section of the vehicle.

12. The method of claim 11,
wherein the controlling of the driving speed, the controlling of the ADAS, and/or the setting of the at least one landmark, based on the information on the longitudinal gradient and the transverse gradient values include:
determining a slope of a current travel section based on the longitudinal gradient value, and controlling the driving speed based on the slope; and
controlling an amount of compensation for pulling in a straight section or a control amount in a curved section, based on the transverse gradient value.

13. The method of claim 11,
wherein the information about the longitudinal gradient and the transverse gradient values further includes a second value of each of the longitudinal gradient and the transverse gradient values of the vehicle, and
wherein the controlling of the driving speed, the controlling of the ADAS, and/or the setting of the at least one landmark, based on the information on the longitudinal gradient and the transverse gradient values include:
calculating a first value of the longitudinal gradient and the transverse gradient values of the vehicle based on at least one sensor;
receiving the second value of the longitudinal gradient and the transverse gradient values from the server;
correcting an offset of the at least one sensor based on a difference between the first value and the second value; and
controlling the ADAS using the at least one sensor with the corrected offset.

14. The method of claim 11,
wherein the setting of the at least one landmark, based on the information on the longitudinal gradient and the transverse gradient values includes:
selecting a plurality of the at least one landmark based on image information obtained from an imaging device of the vehicle control system;
dividing sections between the selected plurality of the at least one landmark into divided distance units based on a specified distance;
applying the information about the longitudinal gradient and the transverse gradient values received from the server to each of the divided distance units; and
setting each section including the divided distance units, wherein the applied gradient values are sequenced, as at least one new landmark.

* * * * *